Dec. 4, 1962  N. K. STENBERG  3,066,530
RATE OF FLOW INDICATOR
Filed June 30, 1958  2 Sheets-Sheet 1
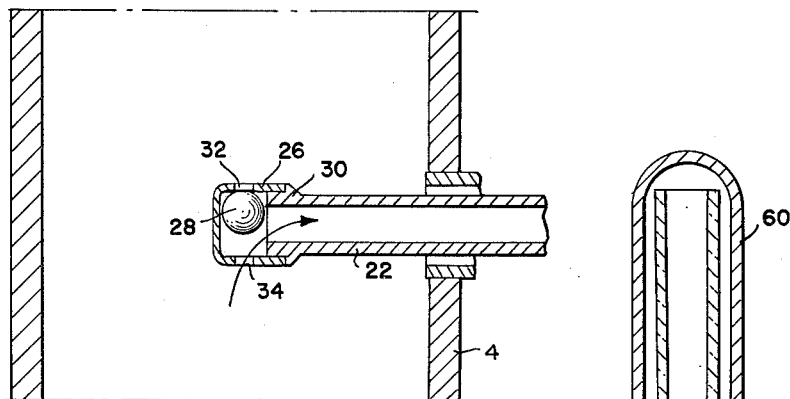
FIG. 2.
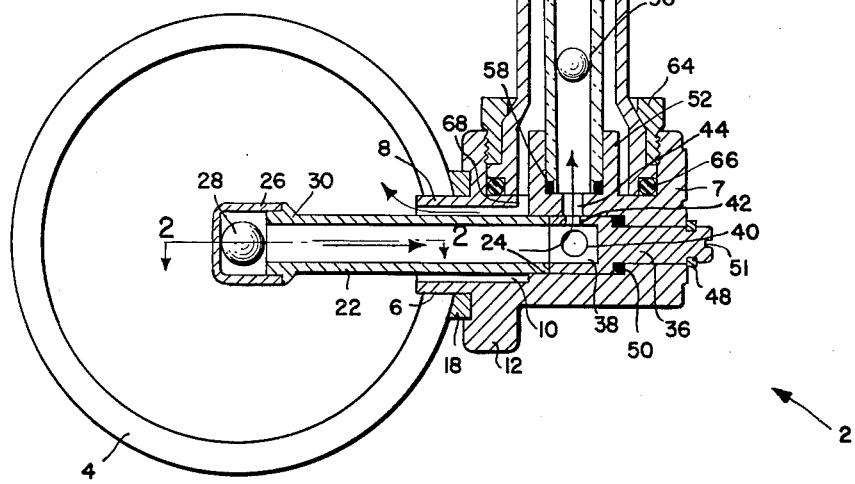
FIG. I.
INVENTOR.
NYYRIKKI K. STENBERG
BY
ATTORNEYS Dec. 4, 1962  N. K. STENBERG  3,066,530
RATE OF FLOW INDICATOR
Filed June 30, 1958  2 Sheets-Sheet 2

INVENTOR.
NYYRIKKI K. STENBERG
BY
ATTORNEYS

Patented Dec. 4, 1962

3,066,530
RATE OF FLOW INDICATOR
Nyyrikki K. Stenberg, Roslyn, Pa., assignor to Fischer & Porter Company, Hatboro, Pa., a corporation of Pennsylvania
Filed June 30, 1958, Ser. No. 745,423
6 Claims. (Cl. 73—203)

This invention relates to a rate of flow indicator and is of particular utility for indicating the rate of flow of fluid in a conduit.

The rate of flow indicator in accordance with this invention works on the impact principle whereby the velocity head is measured by the bypass flow rate. The apparatus is highly advantageous due to the marked simplicity of its installation which requires only one opening in the conduit in association with which it is to be used. Further, it is advantageous in that it has great flexibility, being usable to obtain a wide range of rates of flow.

The apparatus in accordance with this invention is further advantageous in that it is provided with a double impact arrangement permitting the measurement of the rate of flow in a conduit irrespective of the direction of flow through the conduit. This is important for applications such as swimming pool filter applications where flow is desirably measured during normal filtration as well as when back-washing the filters.

These and other objects of the invention will become apparent upon reading the description in conjunction with the accompanying drawings in which:

FIGURE 1 is a vertical section of a rate of flow indicator in accordance with this invention;

FIGURE 2 is a horizontal section taken on the plane indicated by line 2—2 in FIGURE 1;

Figure 3:
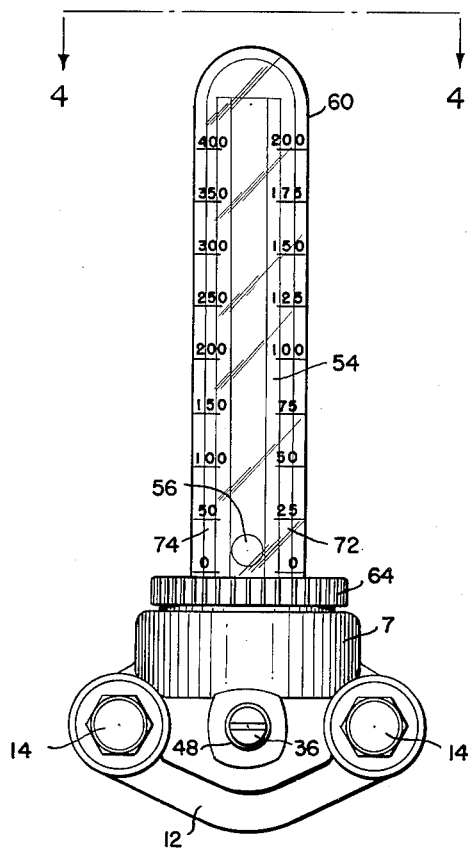
FIGURE 3 is a front elevation of the indicator of FIGURE 1.

Referring now to FIGURE 1, a rate of flow indicator 2 in accordance with this invention is adapted to be employed with a conduit 4 provided with an opening 6. The indicator 2 comprises a hollow housing 7 which is provided with a tube 8 which, as shown, is adapted to be inserted within opening 6 in conduit 4 perpendicular to the line of fluid flow in conduit 4. Tube 8 connects the interior of conduit 4 to the hollow interior 10 of housing 7.

Housing 7 has a flange portion 12 (FIGURE 3) which is secured to conduit 4 by machine screws 14, a ring gasket 18 being interposed between flange 12 and conduit 4.

A tube 22 passes through tube 8 into the hollow interior of housing 7 and is secured by a press fit in restricted bore 24 in housing 7. A cap 26 square in vertical cross section and containing a ball check valve 28 is mounted on flanged end 30 of tube 22. Cap 26 is provided with opposed openings 32 and 34 which are coaxial with the axis of conduit 4.

Adjustment member 36 has a hollow portion 38 in registry with tube 22 and provided with an opening 40 and a smaller opening 42 providing a connection with opening 44 in housing 7. Member 36 is held in position by a snap ring 48, fluid tightness being provided by O-ring 50. A slot 51 in member 36 facilitates turning by a screw driver.

Mounted above opening 44 in collar 52 is a flow meter of the variable area type comprising tapered transparent tube 54 preferably of glass or of a synthetic resin and float 56. An O-ring 58 is employed to provide fluid tightness between tube 54 and collar 52.

Figure 4:
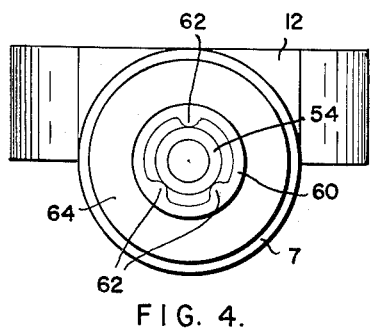
FIGURE 4 is a horizontal section taken on the plane indicated by line 4—4 in FIGURE 1.

A transparent tube 60 preferably of glass or of a synthetic resin encompasses tube 54 and is provided with ribs 62 (FIGURE 4) for the lateral support of tube 54. Tube 60 is secured to housing 7 by a threaded collar 64, an O-ring 66 being employed to insure fluid tightness. An opening 68 in housing 7 connects the interior of tube 60 to the hollow interior 10 of housing 7.

As best seen in FIGURE 3, tube 7 has marked thereon a pair of scales 72 and 74. Scale 72 might, for example, represent from zero to 200 gallons per minute and would be read when opening 40 is lined up with opening 44. Scale 74 providing a reading from zero to 400 gallons per minute is adapted to be read when the smaller opening 42 is lined upon with opening 44. Thus, it will be seen that by coordinating the scales with a variety of orifice sizes a wide range of flow rates can be measured.

*Operation*

The desired orifice having been positioned opposite opening 44 by rotating member 36, fluid flowing from bottom to top as viewed in FIGURE 2 causes ball valve 28 to seat against opening 32, thus, diverting the flow of fluid into tube 22, the hollow portion 38 of member 36, through the selected opening 42, opening 44 and up through tube 54. The position of float 56 in relation to the cross-sectional area of tube 54 will indicate on the appropriate scale, in this case on scale 74, the rate of flow of fluid in conduit 4. The fluid discharging from tube 54 will pass through tube 60, opening 68 in housing 7, through the hollow interior 10 of housing 7 and through tube 8 into the interior of conduit 4.

It will be appreciated that the operation will be the same when the flow of fluid in conduit 4 is reversed. In this event, valve 28 is moved over to block opening 34 and the remainder of the operation is as described above.

It is not desired to be limited except as set forth in the following claims.

What is claimed is:

1. A conduit adapted to communicate with a passage for fluid flow and having a pair of opposed inlet openings on an axis in the direction of the run of said passage, a valve adapted to selectively close off the opening facing in the direction of flow of fluid through said passage, a rotameter, means to connect said conduit to the inlet end of the rotameter, and means to convey fluid from the outlet end of said rotameter and discharge it into said passage.

2. A hollow housing having a tubular portion adapted to communicate with a passage for fluid flow, a conduit passing through a portion of said tubular portion and having a pair of opposed inlet openings on an axis in the direction of run of said passage, a valve adapted to selectively close off the opening facing in the direction of fluid flow in said passage, a rotameter tube mounted on said housing and connected to said conduit, a float in said rotameter tube and means to convey fluid from the upper end of the rotameter tube to the interior of said housing for discharge through the tubular portion into said passage.

3. A hollow housing having a tubular portion adapted to communicate with a passage for fluid flow, the axis of the tubular portion being substantially perpendicular to the axis of the passage, a conduit passing through a portion of said tubular portion and having a pair of opposed openings on an axis in the direction of the run of said passage, a valve adapted to selectively close off the opening facing in the direction of flow of fluid through said passage, a rotameter tube mounted on said housing, means connecting said rotameter tube to said conduit, a float in said rotameter tube and means to convey fluid from the upper end of the rotameter tube to the interior of said housing for discharge through the tubular portion into said passage.

4. A hollow housing having a tubular portion adapted to communicate with a passage for fluid flow, the axis of the tubular portion being substantially perpendicular to the axis of the passage, a conduit passing through a portion of said tubular portion and having a pair of opposed inlet openings on an axis in the direction of run of said passage, a valve adapted to selectively close off the opening facing in the direction of fluid flow in said passage, an upstanding rotameter tube mounted on said housing, means including a variable orifice means to connect said rotameter tube to said conduit, a float in said rotameter tube and means to convey fluid from the upper end of the rotameter tube to the interior of said housing for discharge through the tubular portion into said passage.

5. Apparatus as claimed in claim 3 wherein said means connecting said rotameter tube to said conduit comprises a valve means for controlling flow through said connecting means, said valve means being operable to a plurality of positions to vary the flow, and said rotameter having a scale calibrated in accordance with each of said valve positions for indicating the rate of flow through said passage.

6. A conduit adapted to communicate with a passage for fluid flow and having an opening adapted to face in the direction opposite the direction of fluid flow in said passage, a rotameter, means including a valve to connect said conduit to the inlet end of the rotameter, said valve having a plurality of fixed flow control orifices of different sizes, said valve being movable to a plurality of flow controlling positions to selectively register one of said orifices in communication with the inlet of said rotameter, said rotameter having a plurality of scales for indicating the rate of flow in the passage, each of said scales being calibrated in coordination with a different orifice size, and means to convey fluid from the outlet end of said rotameter and discharge it into said passage, said rotameter having a float member cooperable with each of said scales for flow rate indication.

References Cited in the file of this patent

UNITED STATES PATENTS

| | | |
|---|---|---|
| 172,934 | Prall | Feb. 1, 1876 |
| 1,675,231 | Stoke | June 26, 1928 |
| 1,809,376 | Cole | June 9, 1931 |
| 2,009,427 | Bentzel | July 30, 1935 |
| 2,778,223 | Kimbrell | Jan. 22, 1957 |
| 2,993,374 | Dwyer et al. | July 25, 1961 |

FOREIGN PATENTS

| | | |
|---|---|---|
| 733,905 | Great Britain | July 20, 1955 |